UNITED STATES PATENT OFFICE.

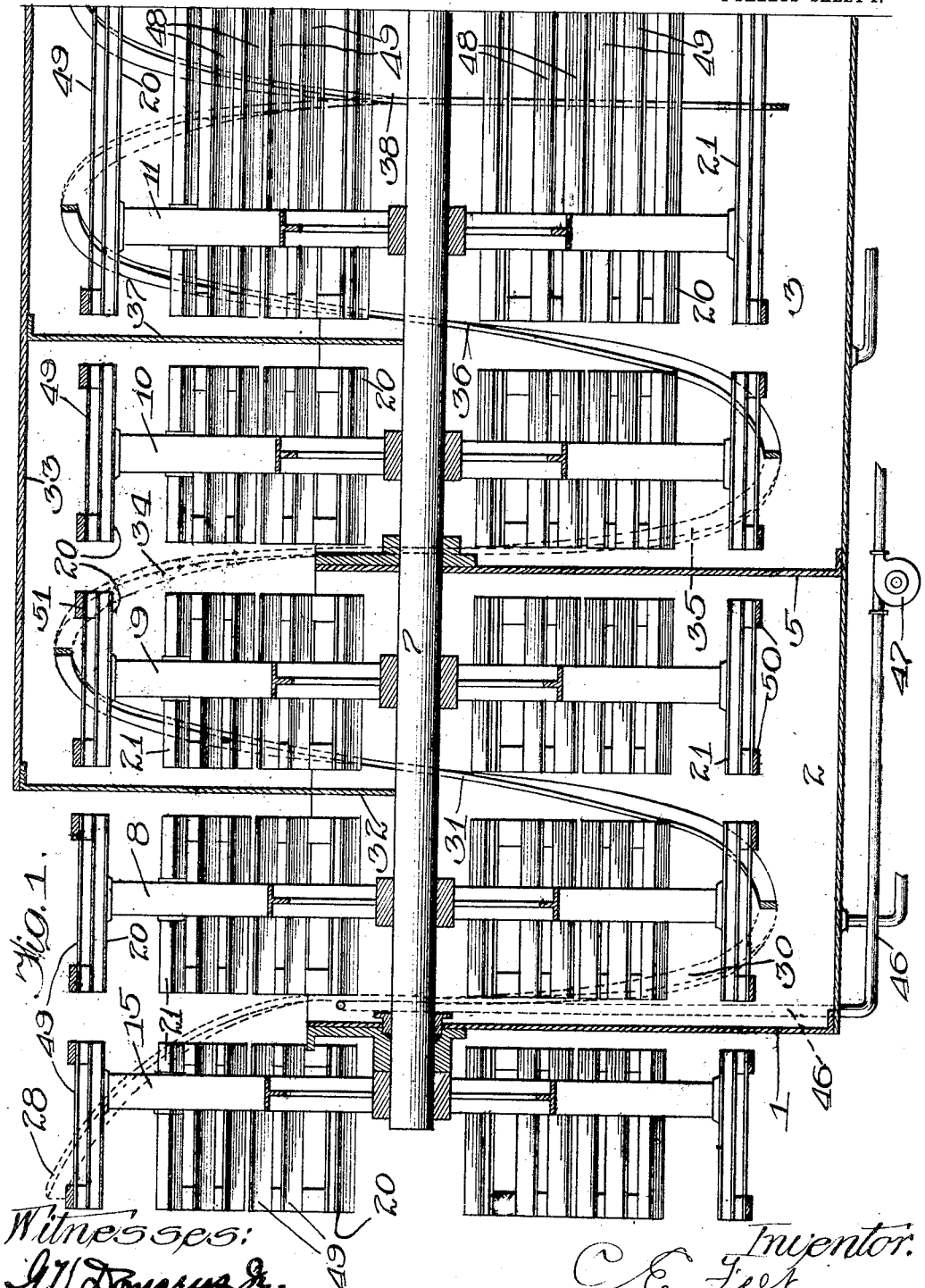

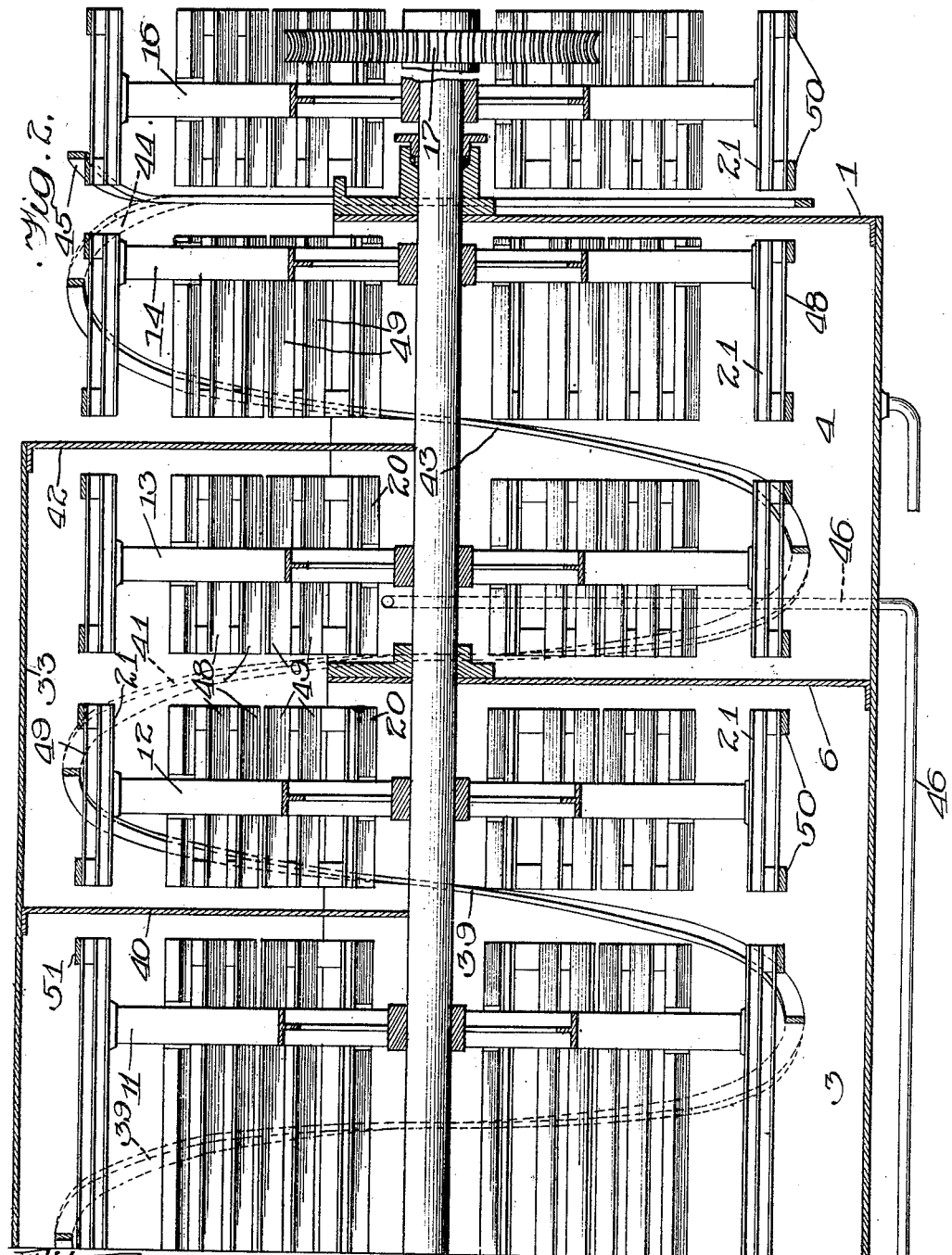

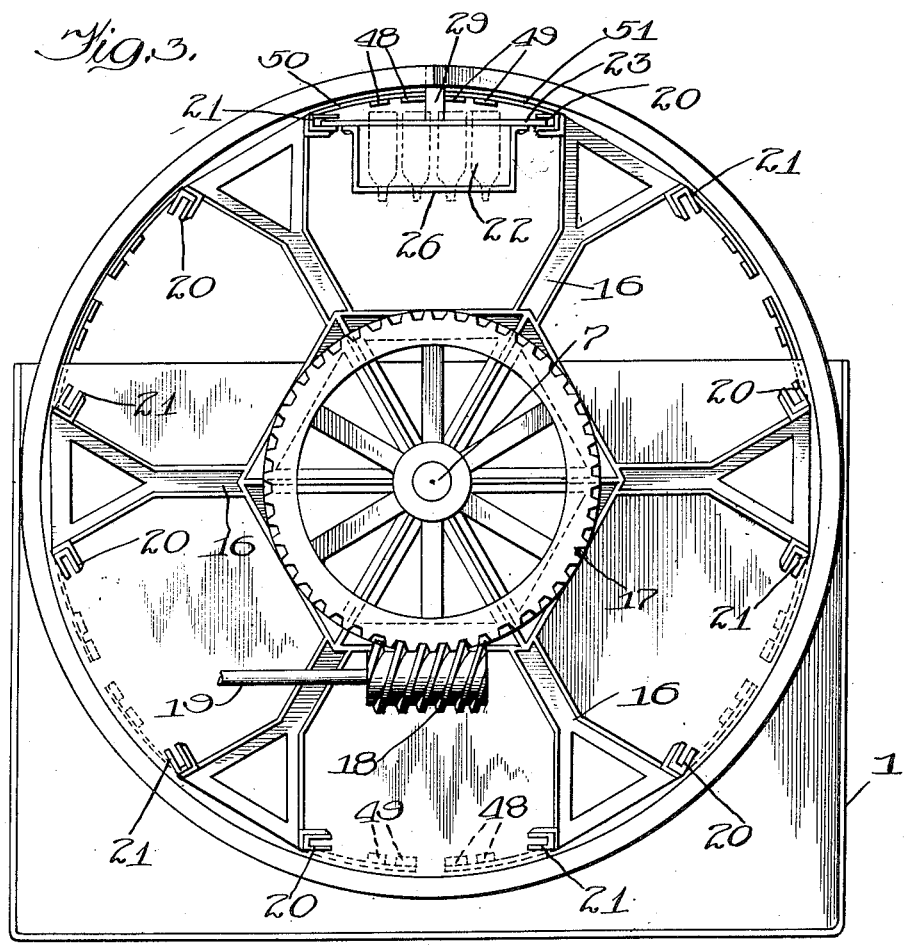

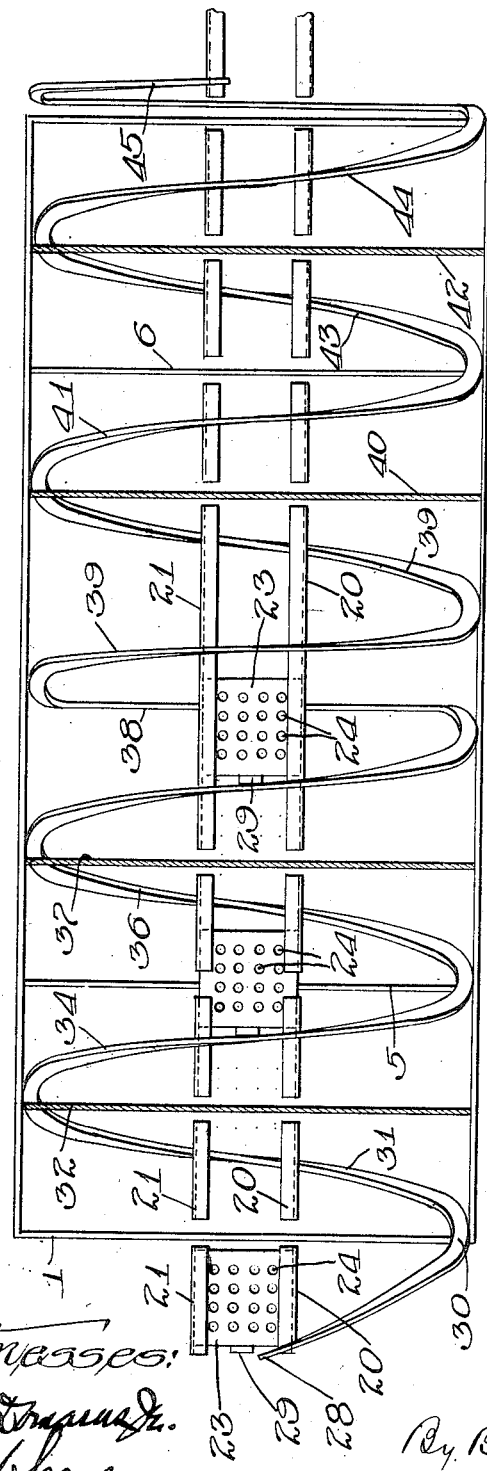

CHARLES E. FELT, OF CHICAGO, ILLINOIS.

PASTEURIZING-MACHINE.

1,102,486.  Specification of Letters Patent.  Patented July 7, 1914.

Application filed January 11, 1908. Serial No. 410,354.

*To all whom it may concern:*

Be it known that I, CHARLES E. FELT, a citizen of the United States, residing at Chicago, in the county of Cook and State of Illinois, have invented certain new and useful Improvements in Pasteurizing-Machines, of which the following is a full, clear, and exact specification.

This invention relates to machines for pasteurizing beer and other substances by submitting the same first to gradually increasing and then to gradually decreasing degrees of temperature, and the invention has for its primary object to provide an improved, simple and efficient form of machine for accomplishing this result.

Another object of the invention is to mechanically agitate the material being pasteurized during the pasteurizing operation so that a more perfect or uniform temperature throughout the contents of each bottle or receptacle will be maintained irrespective of the shape of the receptacle.

A still further object of the invention is to subject all bottles or other receptacles containing the material to be pasteurized, such as beer and other liquors or beverages that have been charged with gas, to successive inverting actions whereby the carbonic acid gas or other gas will be thoroughly commingled with the contents of the bottle during the pasteurizing process, and will be less liable to escape under the high temperature to which it is subjected.

With a view to the attainment of these ends and the accomplishment of certain other objects which will hereinafter appear, the invention consists in the features of novelty which will now be described, reference being had to the accompanying drawings showing a machine embodying the invention, and in which drawings—

Figure 1 is a vertical longitudinal sectional view of the inlet end of the machine; Fig. 2 is a similar view of the discharge end; Fig. 3 is an end elevation of the discharge end of the machine; Fig. 4 is a detail perspective view of one of the bottle crates; Fig. 5 is a cross-section thereof; Fig. 6 is a diagrammatic plan view of the machine, showing the crates passing through the machine; Fig. 7 is a diagrammatic end elevation of the inlet end of the spiral, showing its relation to one of the carriers; and Fig. 8 is a similar view of the discharge end of the spiral.

According to this invention, the bottle or other receptacle or object to be pasteurized is forced successively into a plurality of pasteurizing chambers which may contain a pasteurizing fluid graded in temperature, and when in each chamber is carried in a direction cross-wise of its general line of travel from the inlet to the outlet end of the machine. The particular means for accomplishing this prolonged travel embodies among other elements a series of inclined guides, and a series of ways on which the crates or receptacles for carrying the bottles slide, the ways and guides having a movement one relatively to the other. By this means a helical movement is imparted to the crates or carriers during their passage.

The numeral 1 indicates a tank which is divided transversely into a plurality of compartments, 2, 3 and 4, by means of a suitable number of partitions, 5—6, and these compartments may be supplied with a pasteurizing fluid, such as water, graded in temperature from cold to hot and hot to cold, commencing with the compartment 2, which may be regarded as the initial compartment, where the objects to be pasteurized are introduced. This tank is provided with a horizontal shaft 7, upon which is secured a number of spider arms, 8, 9, 10, 11, 12, 13 and 14, all arranged to revolve with the shaft 7, within the tank 1, and at the inlet end of the machine the shaft is provided with a spider 15 outside the tank, while at the outlet end it is provided with a spider 16 arranged outside the tank and having also at this end, if desired, suitable means of compelling its rotation, such for example as a worm wheel 17 which is engaged by a worm 18 on a driving shaft 19.

In Fig. 3 of the drawing is presented an end view of one of the spiders. It is, in fact, the outside spider 16, but as these spiders are counterparts of one another, this single view will suffice as an illustration for them all, and they will be seen to consist of a plurality of spokes radiating from a central hub secured to the shaft, and at the outer end of each spoke are mounted two horizontal guide rails in the form of channeled bars 20—21, the bar 20 on one spoke facing the bar 21 on the adjacent spoke so that the channeled bars on adjacent spokes constitute a guide way for supporting and guiding the edge of a crate which carries the bottles 22 containing the material to be pasteurized. The form of this crate is shown in Figs. 4 and 5 of the drawing, and while its particular construction is not material, it preferably consists of an apertured plate 23 having passages 24 of sufficient diameter to receive the body of the bottle, and below this plate 23 is suspended by hangers 25 a similar but smaller plate 26 having similar passages 27 for receiving the necks of the bottles, the projecting edges of the plate 23 being introduced into the channels of the bars 20—21, as shown in Fig. 3. All of the spiders being rigidly fixed on the shaft 7 with relation to each other and the guide-ways 20—21 carried by them, although separate and distinct from one another, as shown in Figs. 1 and 2, are nevertheless thus maintained in accurate alinement with one another, so that the crate may slide from the guide-ways on one spider into the guide-ways on the next, and so on from the inlet to the outlet of the machine, assuming that the crate is given a propelling force at a time when its transit from one spider to another would not bring it into collision with any of the various partitions of the tank or pasteurizing compartments. The crate is given this propelling force by the action of a spiral or series of inclines secured to the tank in conjunction with the rotary motion of the crate induced by its revolution with the shaft 7. These inclines are preferably in the form of a continuous spiral, one extremity 28 of which projects from the inlet end of the tank upwardly and over the circular line of travel of the various guide-ways 20—21 carried on the first outside spider 15, and its end is so positioned that when a crate is placed on one of these guide-ways and the spider rotated, a projection or lug 29 standing at the lower edge of the plate 23, or other suitable position on the crate, will come into engagement with the inner or forward face of this projecting end 28 of the spiral, and as better shown in Fig. 6, the spiral being so formed and curved in a downward and forward direction as to pass over the end wall and down into the compartment 2 of the tank, the crate will be forced along the first pair of ways 20—21 on the first spider 15, and will be eventually pushed on to the diametrically opposite ways 20—21 of the next spider 8, which, by its rotary action, will carry the crate in a direction crosswise of the general line of travel of the crate from inlet to outlet, and thereby prolong the stay of the crate within the first compartment. From the lower end of the protruding portion 28 of the spiral, the spiral continues as an Archimedean screw, always encompassing the circular line of travel of the ways 20—21, and varying its flights or degrees of incline according to whether it be desired to increase or decrease the speed of the forward travel of the crate with respect to its rotary or lateral travel. Thus it will be seen that where the spiral or incline first enters the end of the tank on the left, as shown at 30, its degree of inclination is very slight, so that after the crate is once over the end wall, its travel lengthwise on the guide-ways on the spider 8 will be very slight until it begins to rise out of the tank, when the spiral or incline increases its angle, as shown at 31, to carry the crate farther along and beyond the end wall 32, which is part of a hood 33 arranged over the tank 1 for confining the steam or vapors rising from the pasteurizing fluid and for maintaining the temperature of such fluid. From here on the spiral curves upwardly and then downwardly, as shown at 34, to carry the crate over and beyond the partition 5, whence the inclination of the spiral is again decreased, as shown at 35, to keep the crate within the tank or compartment 3 as long as possible, the incline from the lower end of 35 being increased as the spiral rises, as shown at 36, to pass beyond another partition 37, which is intended to separate the vapors and steam arising from the main body of the compartment 3 and the compartment 2, so that the required difference in temperatures between these two compartments may be maintained. From the compartment 3 the spiral passes into a plane at right angles to the axis of revolution of the crates as shown at 38, so that the duration of the stay of the crate in the compartment 3 may be prolonged as far as is necessary, and from the flight 38 the spiral again assumes proper degrees of inclination, as shown at 39 to carry the crate beyond another partition 40 depending from the head 33, near the end of the compartment 3, which is employed for the purpose of maintaining the required difference in temperature between the compartment 3 above the water, and that of the compartment 4 above the water.

The flight 39 of the spiral carries the crate within the reach of the guides mounted upon the spider 12, and the flight 41 carries it from the guides of the spider 12 over the end wall 6 and down into the compartment 4, between the end wall 6 and the end wall 42 of the hood 33, and from here a flight 43 carries the crate on to the guides of the end spider 14, whence it is delivered to the guide-ways of the final or delivery spider 16 by a flight 44, which, like the flight 38, is arranged in a plane substantially at right angles to the axis of revolution of the crates so as to avoid a sudden discharge of the crates from the guide ways of the final spider, this right angle flight 44 terminating at its upper end in an outward inclination 45, as better shown in Fig. 6, which is just sufficient to push the crates fairly upon the guide-ways of the spider 16, whence they may be removed by hand.

The water or pasteurizing fluid contained in the tank 1 may, of course, be heated by the usual or any suitable means not necessary to illustrate for maintaining the required difference in temperatures between the compartments 2, 3 and 4, or any other number of such compartments. The water or liquid in the compartment 4 should be cool for the purpose of cooling off the pasteurized material before leaving the machine, but this water necessarily becomes overheated by the hot material coming from the hottest compartment 3, and consequently, means must be provided for keeping its temperature down. On the other hand the water or pasteurizing fluid of the compartment 2, which is required to be warm, so as to give the material as it first enters its initial heating, necessarily becomes overchilled by contact with the beer or other material to be pasteurized, which usually enters the machine directly from the refrigerator. Hence provision must be made for compensating for this loss of heat in the compartment 2. In order that the surplus of heat occurring in the final compartment 4 may be utilized for counteracting the loss of heat in the compartment 2, and the loss of heat in the compartment 2 may be utilized for counteracting the increasing heat in the compartment 4, these two compartments are placed in communication by suitable circulating passages, the water being taken from the coldest part of the compartment 2 by means of a pipe 46 and conducted to the hottest part of the compartment 4, the ends of the pipe preferably entering both compartments at the upper part, entering the compartment 2 at the upper and outer end, but entering the compartment 4 at the upper and inner end, it being understood that the water in compartment 2 will be coldest where it first comes in contact with the refrigerated bottles. If desired, a circulating pump 47 may be introduced in the pipe 46 for inducing circulation. It is of course obvious that the bottles 22 thus resting freely in the apertures 24 would drop out of the carrier or crate when the latter is inverted in passing down into the pasteurizing compartments unless some special means be employed for holding them in. In order that the work of the attendant in removing the bottles may not have to be multiplied by having to release any special fastening devices for thus retaining the bottles, it is preferable to have the retaining means form a part of the pasteurizing machine itself as counter-distinct from the crate or carrier. To that end, a series of slats or grates 48—49 are mounted upon the spokes of the spiders in such a position that one of these slats or grates will be directly over each row of bottles, and all of the slats or grates for every pair of arms or spokes are in line, that is to say, the four slats or grates carried by one pair of arms or spokes are directly in line respectively with the four carried by the corresponding pair of arms or spokes of the next spider, and so on throughout the length of the machine. The two grates or slats 48 are carried by transversely extending arms or brackets 50 projecting from one of the guide-ways or channel-bars 20—21, while the other two slats or grates 49 are carried by a similar bracket 51 on the other one of the guide-ways or channel-bars 20—21.

With the machine thus constructed and operated, it will be seen that the bottles while passing through the machine and revolving with the various spiders, are repeatedly inverted and the contents thereof continually agitated while being pasteurized, while it is also thoroughly commingled with the carbonic acid or other gas with which the contents may be charged, and consequently the gas will be less liable to escape under the high temperature to which the contents is subjected in the pasteurizing operation, and by this constant agitation of the contents it will be seen that although the bottles may be of irregular shape and consequently more readily penetrated by the heat at one point than at another, thus making the contents at one point hotter than at another, the heating will nevertheless be uniform because of the continual stirring or changing of position of the contents in the bottles.

In order that the invention might be understood by those skilled in the art, the details of an exemplification thereof have been thus specifically described, but

What I claim as new and desire to secure by Letters Patent is:

1. In a machine of the class described, the combination of a receptacle with upwardly extending partitions forming a plurality of compartments, a hood with depending partitions disposed intermediate the other partitions forming compartments therein, said partitions extending below the upper edges of said other partitions to form a fluid seal for said compartments, a spiral guide extending lengthwise of the receptacle through the compartments, a carrier having means to engage said guide, and means to rotate said carrier.

2. In a pasteurizer the combination of a pasteurizing compartment, a cover therefor provided with depending partitions, a spiral arranged within said compartment, and extending between said partitions and the end walls of said compartment, a carrier for carrying the object to be pasteurized through said compartment, having means for engagement with said spiral, a guide-way engaging said carrier extending lengthwise of the axis of the spiral, and means for moving said guide-way and carrier in a direction transverse to the axis of the spiral.

3. In a pasteurizer the combination of a pasteurizing compartment, a spiral arranged contiguous thereto, a cover for said compartment provided with partitions depending on either side of each end wall thereof, a series of guide-ways, a plurality of carriers for holding the objects to be pasteurized, said carriers being arranged on said guide-ways and provided with means for engagement with said spiral, and means for revolving said guide-ways in a plane transverse to the axis of the spiral.

4. In a pasteurizer the combination of the pasteurizer receptacle having a plurality of partitions forming a succession of pasteurizing compartments, a spiral arranged contiguous to said compartments, a cover for said pasteurizer provided with partitions depending therefrom on each side of each partition, a carrier having means for engagement with said spiral for carrying the object to be pasteurized, a guide-way for said carrier divided into a plurality of alined sections arranged in said compartments respectively, and means for moving the sections of said guide-way in a direction transverse to the axis of the spiral.

5. In a pasteurizer the combination of a succession of pasteurizing compartments having partition walls dividing them from each other, a spiral arranged in said succession of compartments and having its convolutions so disposed as to pass over said partitions at one or more points, the convolutions at other points being substantially without inclination lengthwise of the spiral, a cover for the pasteurizer having partitions depending therefrom adjacent the first said partitions, a carrier for the object to be pasteurized having means for engagement with said spiral, and means for moving the carrier in a direction transverse to the axis of the spiral.

6. In a pasteurizer the combination of a pasteurizing compartment provided with a cover for retaining the vapors therein, a spiral arranged contiguous thereto, a carrier movably engaging said spiral, means for moving said carrier in a direction transverse to the axis of the spiral whereby the carrier will be advanced lengthwise of the axis of the spiral, and means arranged contiguous to the line of movement of the carrier for holding the object to be pasteurized against dislodgment from the carrier.

7. In a pasteurizer the combination of a pasteurizing compartment provided with a vapor-retaining cover, a spiral arranged contiguous thereto, a carrier movably engaging said spiral, a guide-way also movably engaging said carrier, means for moving said guideway in a direction transverse to the axis of the spiral, and means extending lengthwise of the spiral but moving with said guide-way and arranged contiguous to the carrier for holding the object to be pasteurized against dislodgment from the carrier.

8. In a pasteurizer, the combination of a pasteurizing compartment having a hood, a spiral arranged contiguous thereto, a guideway movable with respect to said spiral in a direction transverse to the axis of the spiral, a carrier movably engaging said spiral and said guideway, means for moving said guideway, and a grate extending lengthwise of the spiral contiguous to the carrier and movable with said guideway for preventing the object to be pasteurized from falling out of the carrier.

9. In a pasteurizer the combination of a pasteurizing compartment, a vapor-holding hood therefor, a spiral arranged contiguous thereto, a guide-way revoluble within the spiral and compartment, and a carrier for the object to be pasteurized adapted to move on said guide-way and having means for engagement with said spiral whereby the revolving motion of the guide-way will cause the carrier to move lengthwise of the axis of the spiral.

In testimony whereof I have signed my name to this specification, in the presence of two subscribing witnesses, on this 9th day of January, A. D. 1908.

CHARLES E. FELT.

Witnesses:
 CHARLES H. SEEM,
 J. H. JOCHUM, Jr.